United States Patent [19]

Grawey et al.

[11] 4,177,027
[45] Dec. 4, 1979

[54] CORE PORTION FOR A TUBE TIRE

[75] Inventors: Charles E. Grawey; Glenn A. Ball, both of Peoria; Donald G. Zook, Metamora, all of Ill.

[73] Assignee: Caterpillar Tractor Co., Peoria, Ill.

[21] Appl. No.: 888,706

[22] Filed: Mar. 20, 1978

Related U.S. Application Data

[60] Continuation of Ser. No. 635,812, Nov. 28, 1975, abandoned, which is a continuation of Ser. No. 491,841, Jul. 25, 1974, abandoned, which is a division of Ser. No. 370,204, Jun. 15, 1973, Pat. No. 3,883,287.

[51] Int. Cl.² ............................................. B29H 5/18
[52] U.S. Cl. ...................................... 425/49; 264/317
[58] Field of Search .................... 249/61, 175; 425/49

[56] References Cited

U.S. PATENT DOCUMENTS

| 867,688 | 10/1907 | Waldron | 164/400 |
| 1,704,538 | 3/1929 | Hatfield | 425/49 |
| 2,973,562 | 3/1961 | Miller | 164/170 |
| 3,156,958 | 11/1964 | Miller et al. | 164/170 |
| 3,606,921 | 9/1971 | Grawey | 425/49 |

Primary Examiner—Murray Tillman
Assistant Examiner—Arthur H. Koeckert
Attorney, Agent, or Firm—John W. Grant

[57] ABSTRACT

Apparatus includes a rigid mold body and an expandable bladder associated therewith. The bladder is inflatable and expandable to form and press sand core material between itself and the mold body while exerting uniform compressive force over the total surface area of the core material thereby forming a portion of a hollow core of precise external dimension and uniform overall strength. Roll-restraining hoop members can be molded into the sand core at the surface facing the axis of the annulus. A pair of such cores forms a hollow core with two sets of hoops on which a tube-tire is formed.

7 Claims, 8 Drawing Figures

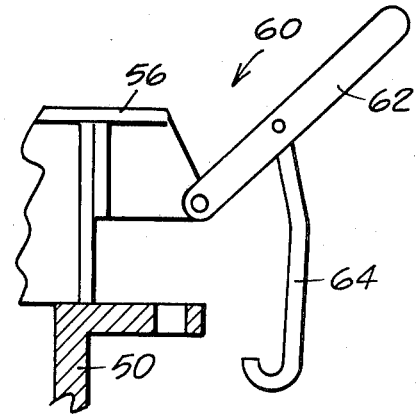
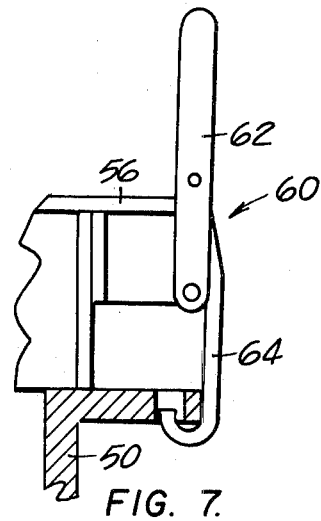
FIG. 6.
FIG. 7.
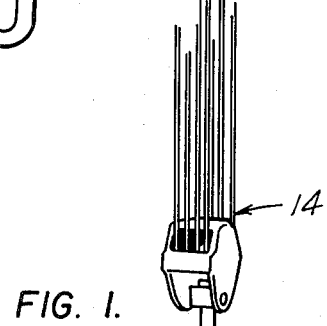
FIG. 1.
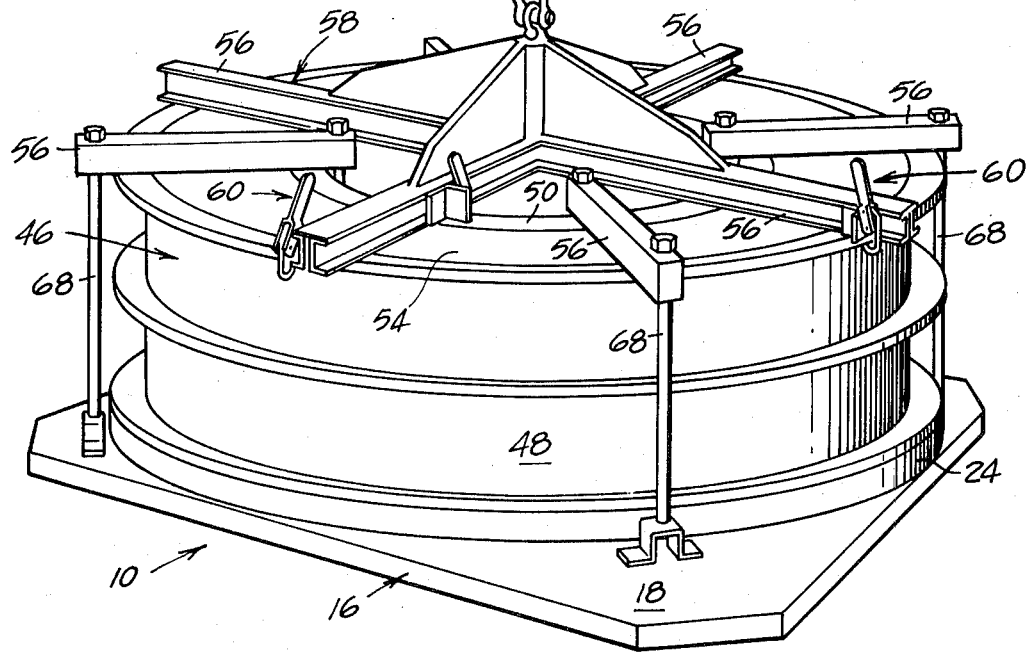

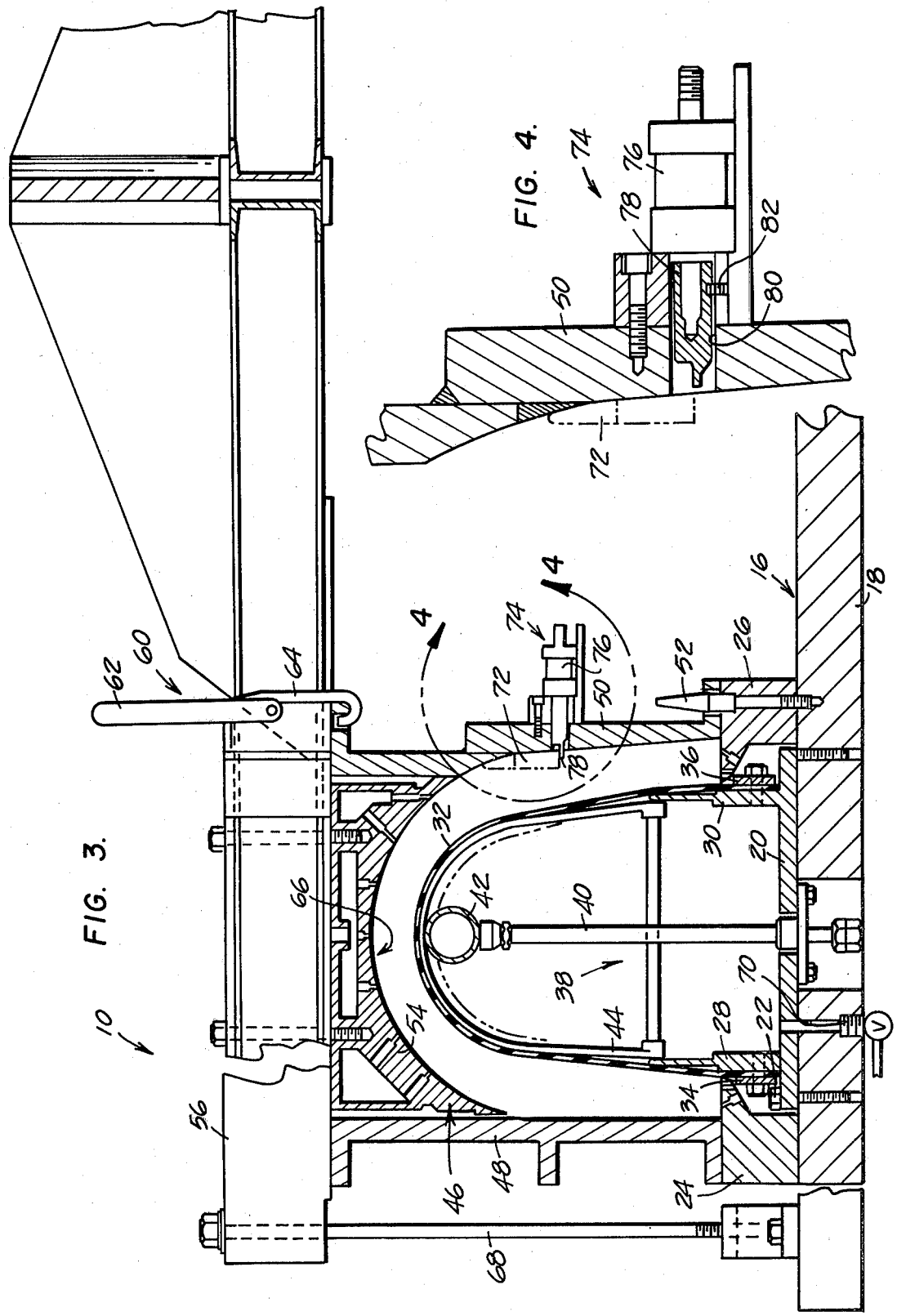

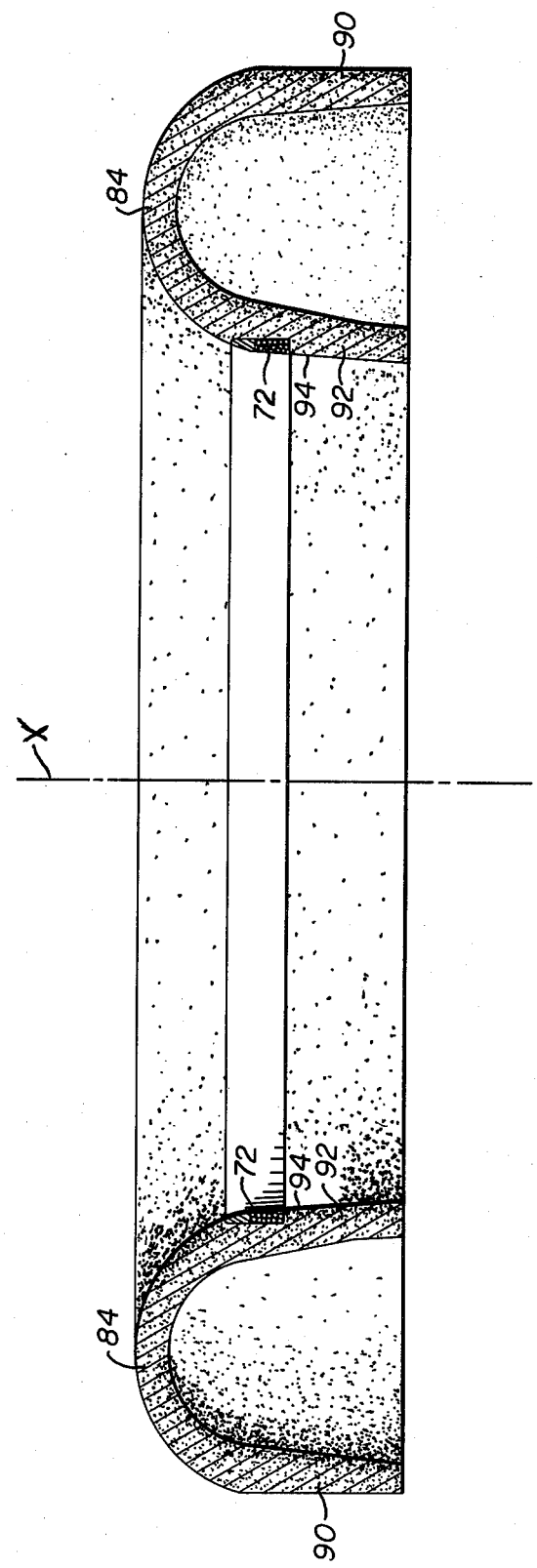

CORE PORTION FOR A TUBE TIRE

This a continuation of Ser. No. 635,812, filed Nov. 28, 1975, now abandoned, which is a continuation of Ser. No. 491,841, filed July 25, 1974, now abandoned, which is a division of Ser. No. 370,204 filed June 15, 1973, now U.S. Pat. No. 3,883,287.

BACKGROUND OF THE INVENTION

This invention relates to apparatus for forming a portion of a sand core, and more particularly to such an apparatus which utilizes an inflatable and expandable bladder in association with a mold body to form and press sand into the desired shape.

U.S. Pat. No. 3,606,921 to Grawey discloses the use of a sand core on which the invention of that patent, i.e., a tube-tire, is formed. In that patent, the sand core, after the formation of such tube-tire, is disintegrated and removed from within the tube-tire.

The problem of the formation of the sand core itself is a serious one, since, because of the extremely great size of such tube-tire to be formed, the core, by necessity, must be extremely large in overall dimension. Such a large core will, of course, be relatively heavy and unwieldy, so that any saving in weight thereof will aid in the ability to handle such core conveniently. Naturally, even though the weight may be reduced, there can be no sacrifice in overall strength in the core for the purpose for which it is designed. For these reasons, a hollow core would be quite advantageous in this use, and the apparatus should be designed to so form such a core.

Furthermore, the apparatus itself should be relatively simple and convenient for such use.

In addition, in the production of the type of tube-tire disclosed in the above-mentioned patent, the formation of the outer core surface is quite critical, since it is on this outer surface the tube-tire will be formed. Meanwhile, the formation of the inner surface of the hollow core, and the shaping thereof, is not critical. Furthermore, as the core material cross-section is reduced in producing a hollow core it becomes increasingly important that the core be of uniform overall strength. Therefore, the apparatus should be capable of exerting uniform compressive force upon the total surface area of the core material regardless of whether such material is evenly distributed within the mold.

SUMMARY OF THE INVENTION

It is an object of this invention to provide a core press which is capable of forming and pressing sand into the shape and configuration of a portion of a sand core.

It is a further object of this invention to provide a core press which, while fulfilling the above object, forms a core portion which, when combined with another like core portion, defines a hollow sand core.

It is a still further object of this invention to provide a core press which, while fulfilling the above objects, is capable of particularly properly defining the outer surface and uniformity of strength of the overall sand core.

It is a still further object of this invention to provide a core press which, while fulfilling the above objects, is relatively convenient for use and simple in design.

Broadly stated, the apparatus for pressing and forming sand into a portion of a sand core comprises base means, and an annular bladder of generally U-shaped cross section connected to the base means. Means are included for selectively expanding the bladder from the base means. An outer ring is positioned about the bladder, and is supported by the base means. An inner ring is positioned inwardly of the bladder and is supported by the base means. A support structure is also included and comprises a plurality of radial beam members. A connecting ring is fixed to some of the beam members, and means are included for removably fixing the inner and outer rings to some of the beam members. When so fixed, these inner and outer rings define with the connecting ring a mold body which defines an annular recessed portion of generally U-shaped cross section. Further included are means for removably fixing the support structure relative to the base means. The bladder is inflatable to expand inwardly of the recessed portion, with the support structure so fixed relative to the base means, and the inner and outer rings so fixed relative to some of the beam members, to press and form sand disposed in the recessed portion between the mold body and bladder into a portion of a sand core.

Broadly stated, the method of shaping granular material into a portion of a core comprises providing a mold body having an inwardly recessed portion, and positioning granular material adjacent the inwardly recessed portion of the mold body. Further provided is a bladder associated with the mold body, the bladder being expanded inwardly of the recessed portion of the mold body to press the granular material inwardly of the recessed portion of the mold body.

BRIEF DESCRIPTION OF THE DRAWINGS

These and other objects of the invention will become apparent from a study of the following specification and drawings, in which:

FIG. 1 is an overall perspective view of the core press;

FIG. 3 is a cross-sectional view of a portion of the apparatus as shown in FIG. 1;

FIG. 4 is an enlarged view of the area 4—4 of FIG. 3;

FIGS. 6 and 7 are sequential views showing the mechanism for latching the rings of the apparatus to the beam members thereof; and FIG. 8 is a cross sectional view of the annular core portion.

DESCRIPTION OF THE PREFERRED EMBODIMENT

Shown in FIG. 1 is the mold apparatus 10 for pressing and forming sand into the shape of a portion of a sand core. The core press 10 is shown in its fully assembled state in said FIG. 1 and is shown as being lifted and transported by block and tackle means 14, as the sand core portion to be formed may be of relatively great size, necessitating relatively large and heavy apparatus 10.

Figure 2:
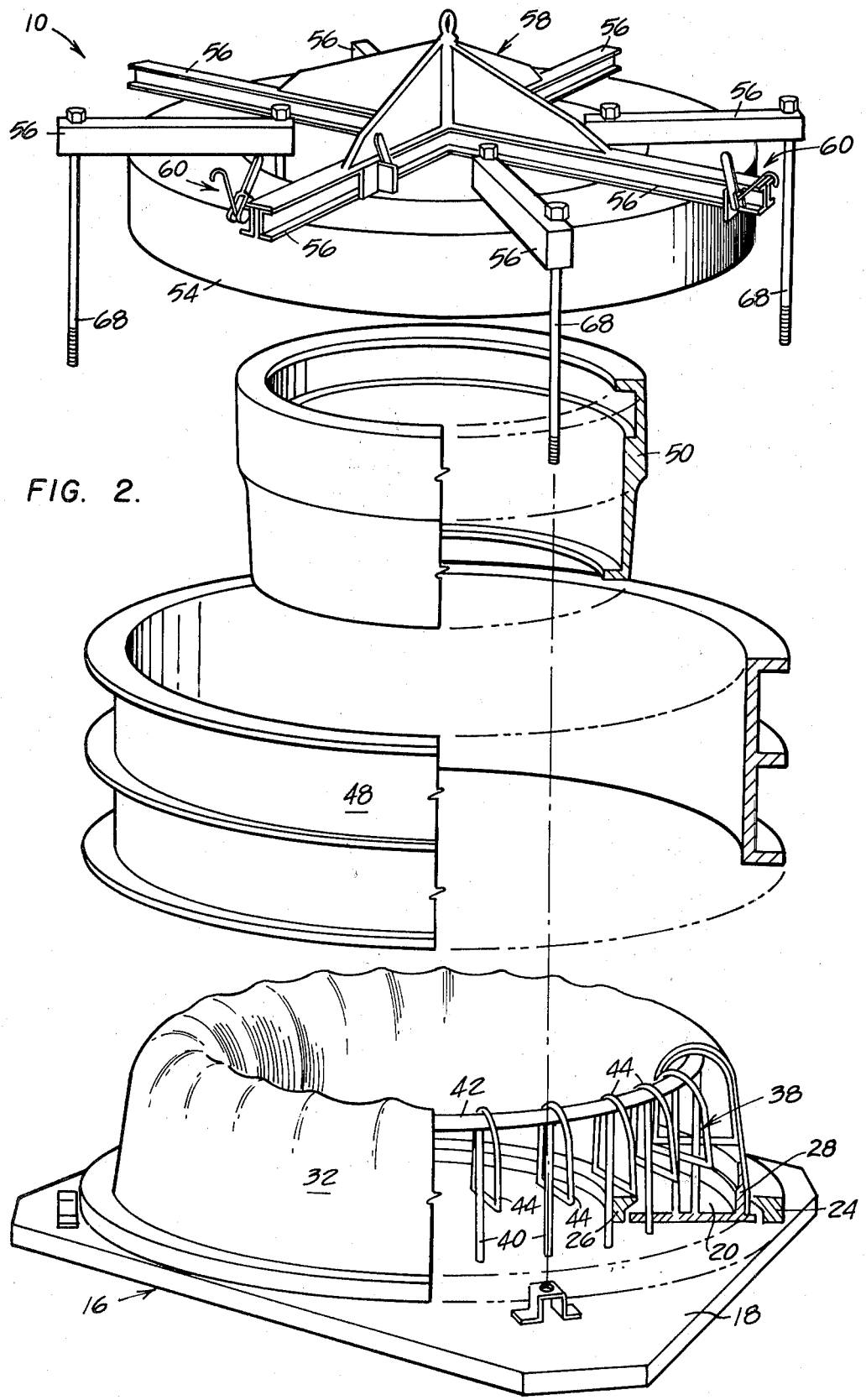
FIG. 2 is an exploded view of the core press shown in FIG. 1.

As shown in FIGS. 1-3, the apparatus 10 includes base means 16. Such base means 16 include a base plate 18, and an annular bladder plate 20 fixed thereto by means of bolts 22, and annular manifolds 24,26 also fixed to the base plate 18, the function of which will later be described.

Fixed to the annular bladder plate 20 are annular ribs 28,30. The downwardly extending edges of an annular bladder 32 of generally U-shaped cross section are disposed along these respective ribs, and each edge is gripped between a rib and a fastening member (as at 34,36) bolted to the associated rib.

Connected to the bladder plate 20 and extending inwardly of the bladder 32 are bladder support means 38. Such support means 38 include a plurality of adjustable poles 40 supporting an annular pipe 42, and a number of wickets 44 associated with the pipe 42 to generally shape the bladder 32.

A mold body 46 is associated with the bladder 32 as shown. The mold body 46 is made up of an outer ring 48 positionable about the bladder 32 and supported by the manifold 24, an inner ring 50 positioned inward of the bladder 32 and supported by the manifold 26 (being located and positioned by dowels 52), and a connecting ring 54. The connecting ring 54 is fixed to some of a plurality of radial beam members 56 which make up a structure 58.

In the assembly of the apparatus 10, the inner and outer rings 50,48 are located on the manifolds 26,24, and the structure 58 is lowered until the connecting ring 54 is disposed intermediate the rings 48,50, and the radial members 56 bear on the rings 48,50.

A number of latches 60 are associated with some of the radial members 56, inwardly and outwardly of the connecting ring 54. An example of such latches 60 is shown in FIGS. 6 and 7, and includes an arm 62 pivotally fixed to a radial member 56, and a hook member 64 pivotally fixed to the arm 62 upwardly of the arm-radial member pivot point, so that, as the arm 62 is moved upward, the hook member 64 will seat in an opening provided in a flanged portion of the ring 50 and will draw the ring 50 and radial member 56 together so that the ring 50 is fixed relative to the structure 58. The other latches 60 for relatively fixing the rings 48,50 to the structure 58, of course, are similar to the one described.

With the rings 48,50 so fixed to the radial members 56, the rings 48,50,54 (i.e., the mold body 46) define together an annular recessed portion 66 (FIG. 3) of generally U-shaped cross section. Tie-down bolts 68, which interconnect some of the radial members 56 and the base plate 18, are then used to force the structure 58 downwardly, so that the structure 58 is fixed relative to the base means 16, the structure 58 being forced against the rings 48,50 on which it is disposed so that the structure 58 is fixed relative to the base means 16.

Through a valve 70 fixed to the bladder plate 20, the bladder 32 is inflatable to extend generally inwardly of the recessed portion 66 of the mold body 46.

In the formation of the portion of the sand core for use in manufacturing the tube-tire of the above-identified patent, it has been found advantageous to provide an article of manufacture in the form of a sand core portion about the annular substantially inextensible roll-restraining hoop 72 of the tube-tire. Consequently, means are included for supporting such roll-restraining hoop 72 within the mold body 46 in close proximity thereto, within the annular recessed portion 66 between the mold body 46 and bladder 32. Such means include a plurality of manually actuated plungers 74, as shown in FIGS. 3 and 4. Each plunger 74 includes a plunger body 76 fixed to the ring 50, and a reciprocable finger 78 disposed within a bore 80 in the body 76 and reciprocable inwardly of the mold body 46 to a point where it extends into the recessed portion 66 thereof, the extent of such penetration being defined by a stop 82 fixed to the finger 78. Upon insertion of a roll-restraining hoop 72, the fingers 78 are manually extended to support such hoop 72 in place.

Figure 5:
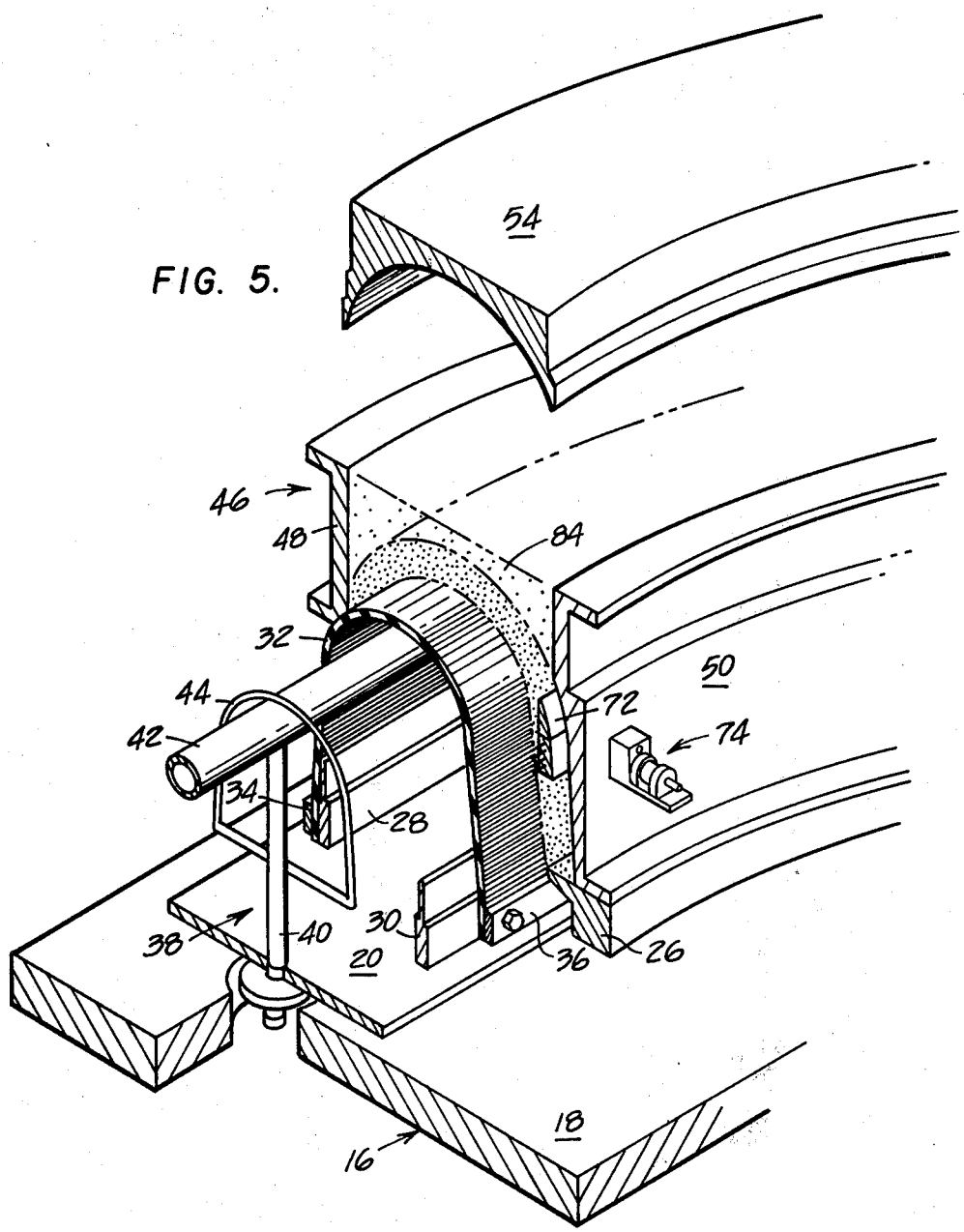
FIG. 5 is a sectional perspective view of the sand forming and pressing area of the core press.

In the use of the device, after positioning of the roll-restraining hoop 72, and the extension of the fingers 78 as described above, a mixture of sand and silica binder 84 is disposed between the rings 48,50 (the structure 58 with connecting ring 54 being moved at this point), as shown in FIG. 5. The sand and silica binder mixture 84 fills out the space between rings 48,50 and above the bladder 32.

The connecting ring 54 is then positioned between the rings 48,50, and the tie-down bolts 68 are used to assemble the apparatus 10.

The support means 38 support the bladder 32 inwardly of the recessed portion 66.

The bladder 32 is then inflated through valve 70 and expanded inwardly of the recessed portion 66 of the mold body 46, to press and form the sand disposed between the mold body 46 and bladder 32 into the shape of a portion of the sand core, the outer surface of the sand core portion being defined by the recessed portion 66 and the inner surface of the core portion being defined by the expanded bladder 32. $CO_2$ is then injected into the mold body through the manifold 24,26 to accomplish curing of the sand core portion. The sand portion has a substantially U-shaped cross section corresponding to the annular recessed portion 66 and has inner and outer legs 92,90. The inner leg 92 has a surface 94 facing the axis X of the annular portion. The annular substantially inextensible roll restraining hoop 72 is positioned at the surface 94 of the inner leg 92 and has an outer surface substantially coplanar with surface 94 of inner leg 92.

After such operation, tie-down bolts 68 are loosened and freed of their attachment in base plate 18 and the fingers 78 are retracted. The structure 58 along with connecting ring 54 and the inner and outer rings 50,48 is then lifted and swung away, leaving the $CO_2$ cured sand core portion exposed above the base means 16. The core portion may then be removed from the apparatus 10.

What is claimed is:

1. An annular core portion, combinable with another like annular core portion for defining a hollow core upon which a tube tire can be formed, comprising; an annular substantially inextensible member and a mixture of granular material and a binder formed about said annular substantially inextensible member, said core portion having a generally U-shaped cross sectional configuration having inner and outer legs, said inner leg having a surface facing the axis of the annular core portion, said annular substantially inextensible member being positioned at said surface of the inner leg.

2. The annular core portion of claim 1 wherein said annular substantially inextensible member has an outer surface substantially coplanar with said surface of said inner leg.

3. The annular core portion of claim 1 wherein said annular substantially inextensible member is a roll restraining hoop for said tube-tire.

4. An article combinable with another like article for defining a hollow core upon which a tube tire can be formed, comprising: an annular substantially inextensible member, and an annular core portion formed about said annular substantially inextensible member, said core portion being a mixture of granular material and a binder and having a generally U-shaped cross sectional configuration having inner and outer legs, said inner leg having a surface facing the axis of the annular core portion, said annular substantially inextensible member being positioned at said surface of said inner leg.

5. The article of claim 4 wherein said annular substantially inextensible member has an outer surface substantially coplanar with said surface of said inner leg.

6. The article of claim 4 wherein said annular substantially inextensible member is a roll restraining hoop for said tube-tire.

7. The article of claim 4 wherein said granular material is sand.

* * * * *